United States Patent
Hathorn et al.

(10) Patent No.: US 12,373,341 B1
(45) Date of Patent: Jul. 29, 2025

(54) GARBAGE COLLECTION FOR STORAGE IN WHICH HIGH-PERFORMANCE VOLUMES RESIDE

(71) Applicant: INTERNATIONAL BUSINESS MACHINES CORPORATION, Armonk, NY (US)

(72) Inventors: Roger G. Hathorn, Tucson, AZ (US); John Charles Elliott, Tucson, AZ (US); Matthew G. Borlick, Tucson, AZ (US); Micah Robison, Tucson, AZ (US); Beth Ann Peterson, Tucson, AZ (US); Lokesh Mohan Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/617,987

(22) Filed: Mar. 27, 2024

(51) Int. Cl.
  *G06F 12/02* (2006.01)
  *G06F 3/06* (2006.01)

(52) U.S. Cl.
  CPC .......... *G06F 12/0246* (2013.01); *G06F 3/061* (2013.01); *G06F 3/0647* (2013.01); *G06F 3/0685* (2013.01); *G06F 2212/7205* (2013.01)

(58) Field of Classification Search
  CPC ......... G06F 12/0246; G06F 2212/7205; G06F 3/061; G06F 3/0647; G06F 3/0685
  See application file for complete search history.

(56) References Cited

U.S. PATENT DOCUMENTS

| | | | |
|---|---|---|---|
| 6,065,020 | A | 5/2000 | Dussud |
| 8,166,233 | B2 | 4/2012 | Schibilla |
| 8,285,959 | B2 | 10/2012 | Jess |
| 10,795,583 | B2 | 10/2020 | Yang |
| 11,726,692 | B2 | 8/2023 | Szczepanik |
| 2008/0007856 | A1 | 1/2008 | Tango et al. |

(Continued)

FOREIGN PATENT DOCUMENTS

WO 2016160163 A1 10/2016

OTHER PUBLICATIONS

"System and Method to Implement Host Tiered Hot Spot Tuning on Storage," IP.com No. IPCOM000202012D, Dec. 1, 2010, 6 pages.

(Continued)

*Primary Examiner* — Chie Yew
(74) *Attorney, Agent, or Firm* — Konrad, Raynes, Davda & Victor LLP; David Victor

(57) ABSTRACT

Provided are a storage device, system, and method for performance enhancing measures for storage in which high-performance volumes reside. Indication is made of a volume configured in the arrays to have high-performance. An array is determined storing the indicated volume. A determination is made of storage devices in which the determined array resides. The storage devices are enabled to perform garbage collection on blocks of data having valid and invalid pages in the storage devices at a first garbage collection rate and a second garbage collection rate. The second garbage collection rate causes a storage device to perform garbage collection with respect to a greater number of blocks than the first garbage collection rate. A command is sent to the determined storage devices to garbage collect at the second garbage collection rate.

20 Claims, 10 Drawing Sheets

(56) References Cited

U.S. PATENT DOCUMENTS

| | | | |
|---|---|---|---|
| 2012/0036309 A1* | 2/2012 | Dillow | G06F 11/108 |
| | | | 711/E12.008 |
| 2014/0000592 A1 | 1/2014 | Rittner et al. | |
| 2014/0032817 A1 | 1/2014 | Bux | |
| 2014/0059279 A1 | 2/2014 | He | |
| 2015/0019797 A1 | 1/2015 | Huang et al. | |
| 2015/0026390 A1* | 1/2015 | Li | G06F 12/0246 |
| | | | 711/103 |
| 2016/0179386 A1 | 6/2016 | Zhang | |
| 2016/0283161 A1 | 9/2016 | Mielke et al. | |
| 2017/0024314 A1* | 1/2017 | Lee | G06F 12/0246 |
| 2020/0012598 A1 | 1/2020 | Feng et al. | |
| 2020/0073571 A1 | 3/2020 | Chen et al. | |
| 2020/0097403 A1 | 3/2020 | Saxena et al. | |
| 2020/0401515 A1 | 12/2020 | Liang et al. | |
| 2022/0035735 A1 | 2/2022 | Bhardwaj | |
| 2022/0334967 A1 | 10/2022 | Galbraith et al. | |

OTHER PUBLICATIONS

Guerra, Jorge et al., "Cost Effective Storage Using Extent Based Dynamic Tiering," 9th USENIX Conference on File and Storage Technologies (FAST 11), 2011, 14 pages.

Kim et al., "AutoSSD an Autonomic SSD Architecture" 2018 USENIX Annual Technical Conference (USENIX ATC 18), 14 pp.

List of Patents or Patent Applications Treated as Related, 2 pp. submitted herewith.

U.S. Appl. No. 18/385,826, filed Oct. 31, 2023.

U.S. Appl. No. 18/617,967, filed Mar. 27, 2024.

Wang et al. "WAS: Wear aware superblock management for prolonging SSD lifetime." ACM Proceedings of the 56th Annual Design Automation Conference 2019, 2019, 6 pp.

United States Non-Final Rejection dated May 5, 2025, 31 pages in U.S. Appl. No. 18/617,967.

* cited by examiner

GARBAGE COLLECTION FOR STORAGE IN WHICH HIGH-PERFORMANCE VOLUMES RESIDE

BACKGROUND OF THE INVENTION

1. Field of the Invention

The present invention relates to a storage device, system, and method for performance enhancing measures for storage in which high-performance volumes reside.

2. Description of the Related Art

Solid state storage devices (for example, solid state drives or SSDs) may be comprised of one or more packages of non-volatile memory dies implementing NAND memory cells, where each die is comprised of storage cells. Storage cells are organized into pages and pages are organized in blocks, and the blocks are stored in planes of a storage die.

In NAND flash memory devices, pages cannot be updated without the entire block of pages being erased and the data written to a new location. To free up blocks of pages, the pages having valid data being used on a block need to be consolidated and written to a new block to fill up all the pages on that new block, and the blocks previously storing the dispersed pages may then be erased to make available for new data. Garbage collection is performed so that there are a sufficient number of free pages to satisfy host write requests to pages in the flash memory.

This constant moving of data between blocks results in many more program/erase (P/E) cycles than requested by the host system, a situation referred to as write amplification. Additional P/E cycles may reduce the SSD's life span and have a negative impact on read and write performance. To address these issues, SSD vendors typically build garbage collection capabilities into their storage controllers, to start garbage collection when a threshold of free storage space is below a certain level and garbage collection stops or is reduced when free storage space exceeds the level.

SUMMARY

Provided are a storage device, system, and method for performance enhancing measures for storage in which high-performance volumes reside. Indication is made of a volume configured in the arrays to have high-performance. An array is determined storing the indicated volume. A determination is made of storage devices in which the determined array resides. The storage devices are enabled to perform garbage collection on blocks of data having valid and invalid pages in the storage devices at a first garbage collection rate and a second garbage collection rate. The second garbage collection rate causes a storage device to perform garbage collection with respect to a greater number of blocks than the first garbage collection rate. A command is sent to the determined storage devices to garbage collect at the second garbage collection rate.

DETAILED DESCRIPTION

Figure 1:
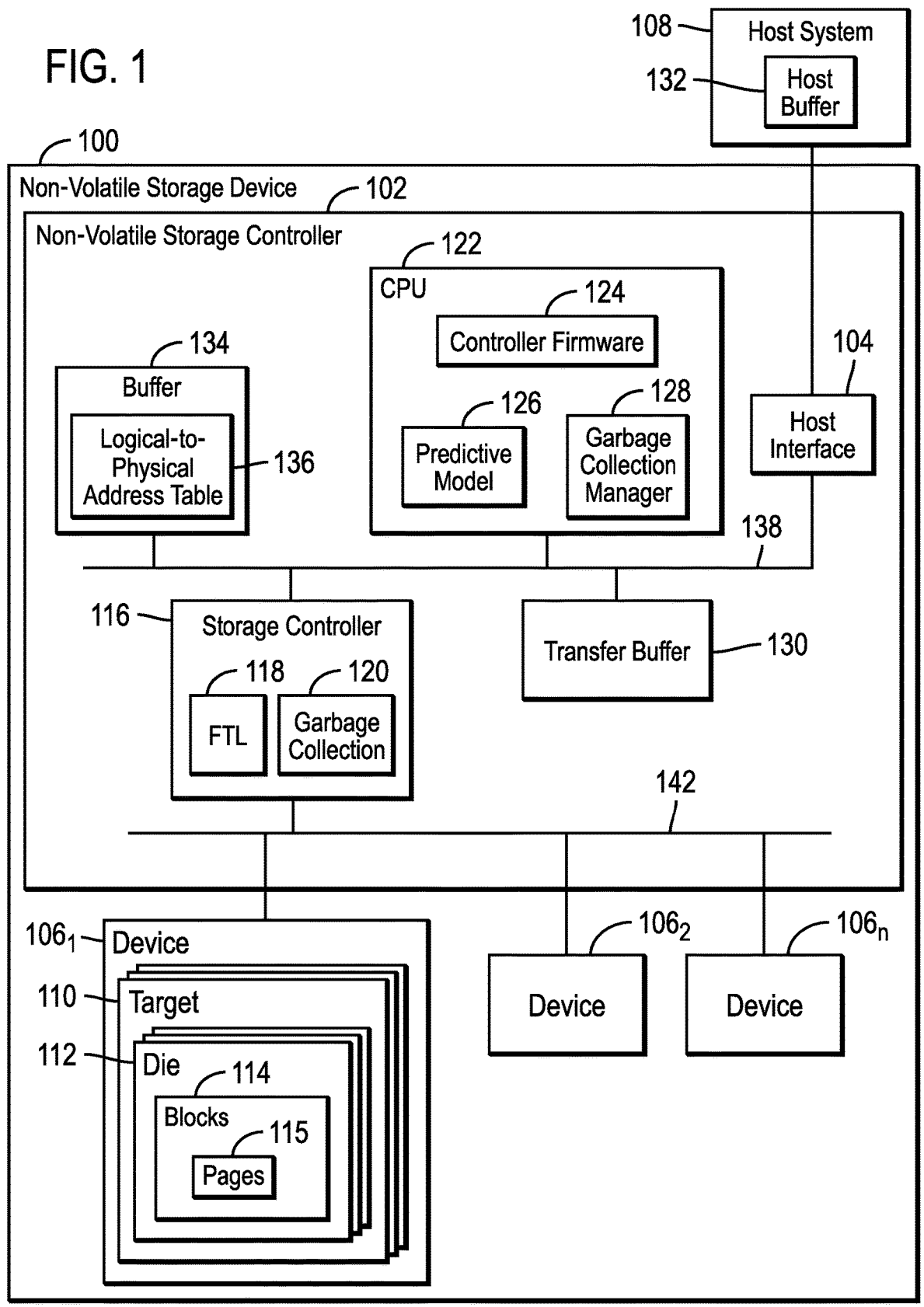
FIG. 1 illustrates an embodiment of a non-volatile storage device.

Garbage collection in a non-volatile storage, such as a flash storage, recycles pages of stale data and consolidates pages of valid data to free-up pages. However, if host writes are not regulated, then garbage collection may not free-up pages at a sufficiently fast rate to provide pages for the rate at which host writes are received. This is known as a rate matching problem where the host writes and the writes associated with the garbage collection, or recirculation, of data must reach a point of equilibrium at a specified capacity otherwise the storage could run out of usable blocks and stall the host application. However, garbage collection may compete for flash storage resources during times of high Input/Output (I/O) access rates.

Described embodiments provide improved techniques for garbage collection to allow for sufficient number of free blocks, i.e., blocks having all invalid pages, while at the same time ensuring that garbage collection does not negatively impact I/O access latency. Described embodiments determine a garbage collection rate based on the I/O access patterns, such that a relatively high I/O access pattern results in a minimum garbage collection rate to garbage collect at a lower rate than garbage collection for lower I/O access patterns. In this way, more resources are directed to garbage collection for relatively lower I/O access rates when garbage collection will not have much effect on I/O access latency, and fewer resources are directed to garbage collection for relatively higher I/O access rates so as not to increase I/O latency.

In described embodiments, fragmented blocks, i.e., blocks having valid and invalid pages, are ordered by an amount of fragmentation, i.e., a number of invalid pages. If there is indication from a host or controller logic in the storage device to garbage collect at a minimum garbage collection rate, then garbage collection is performed until a low free space threshold is reached. If there is indication to garbage collect at a maximum garbage collection rate, then garbage collection is performed until both a low free space threshold is met and there are no blocks with more than a threshold number of invalid pages. If there is indication to garbage collect until full reclamation, then garbage collection is performed for all blocks over a threshold number of invalid pages. Blocks with fewer than the threshold number of invalid pages are garbage collected only if free space, e.g., invalid pages, consumed by these blocks exceeds a threshold.

Described embodiments further provide improvements to computer technology for improving the performance of storage on which indicated high-performance volumes reside. To improve the performance of the storage, the described embodiments may perform multiple performance enhancing operations, such as increasing a cache threshold for arrays, on which the high-performance volumes reside, of the total cache storage at which destaging of data must occur before new writes are applied. Described embodiments may further or alternatively migrate data in extents, having a low access rate, in arrays on which the high-performance volumes reside, to another array not used by the high-performance volumes. Described embodiments may further or alternatively determine the storage devices in which the high-performance volumes reside and send commands to the determined storage devices to perform garbage collection at a higher rate or full reclamation rate to improve performance.

FIG. 1 illustrates an embodiment of a non-volatile storage ("NVS") device 100 having a non-volatile storage controller 102, including a host interface 104 to transfer blocks of data and I/O commands between a plurality of groups of devices $106_1, 106_2 \ldots 106_n$ of the storage device 100, such as NAND chips, and a host system 108 or storage controller. Each device $106_1, 106_2 \ldots 106_n$, may include, as shown with respect to device $106_1$, a plurality of targets 110, where each target 110 has one or more dies 112. Each die 112 may include a plurality of blocks 114, and each block a plurality of pages 115 having the storage cells. In NAND implementations, the cells forming the pages may comprise floating gates transistors, where cells within a block are connected in a grid connected via a bitline via source/drains and a wordline connects via control gates. This wordline-bitline structure allows all cells in a page to be programmed (written or erased) or read in parallel. In NAND implementations, the cells in the blocks may comprise a quad level cell (QLC), where there are 4 bit layers per cell, or other cell levels, e.g., Single Level Cell (SLC), Multiple Level Cell (MLC), Tri Level Cell (TLC), etc.

The non-volatile storage controller 102 includes one or more internal storage controllers 116 to perform read and write operations with respect to the pages 115 of a die 112. The storage controller 116, such as a flash memory controller, includes a flash translation layer (FTL) 118 to manage mapping between logical and physical addresses in the pages 115 and garbage collection logic 120 to perform garbage collection operations to consolidate valid data dispersed on pages into fewer pages where the valid data fills the pages.

The non-volatile storage controller 102 may include a central processing unit (CPU) 122 implementing controller firmware 124, also referred to as a memory controller, managing the operations of the non-volatile storage device 100, a predictive model 126 to classify I/O access patterns of data in the NVS device 100 to one of a plurality of garbage collection rates, and a garbage collection manager 128 to manage garbage collection 120 operations based on a garbage collection rate provided by the predictive model 126 or from the host system 108.

The predictive model 126 receives as input current and historical I/O access patterns to output one of a plurality of garbage collection rates, such as minimum garbage collection rate, maximum garbage collection rate, and full reclamation of fragmented blocks having valid and invalid pages. A page having valid data comprises a valid page and a page having no valid data comprises an invalid page of free space. A higher I/O access pattern corresponds to a lower garbage collection rate and a relatively lower I/O access pattern corresponds to a higher garbage collection rate because increasing garbage collection for low I/O access rates should not affect storage performance.

The predictive model 126 may implement a heuristic algorithm to determine the garbage collection rate based on current and historical I/O access patterns at the storage device 100. Alternatively, the predictive model 126 may comprise a classification machine learning model to receive as input, current I/O access patterns, historical I/O access patterns, and/or other information to output a corresponding garbage collection rate, e.g., maximum, minimum, and full reclamation.

The controller 102 further includes a non-volatile transfer buffer 130 comprising a non-volatile memory device to cache and buffer transferred read and write commands from the host buffer 132.

The controller 102 may further include a buffer 134, such as a Dynamic Random Access Memory (DRAM) or other volatile or non-volatile memory device, to store a logical-to-physical address table 136 providing a mapping of logical addresses to which I/O requests are directed and physical addresses in the devices $106_1, 106_2 \ldots 106_n$ at which the data for the logical addresses are stored. The logical addresses may comprise logical block address (LBAs) or other logical addresses known in the art. The FTL 118 uses the logical-to-physical address table 136 to determine physical locations in the devices $106_1, 106_2 \ldots 106_n$ at which data is to be stored.

This architecture of the storage controller 116 and hardware interface 124 may be repeated for different dies 112, targets 110, and devices $106_i$.

The non-volatile storage device 100 may function as both a memory device and/or a storage device (for example, a Solid-State Drive (SSD)) in a computing system, and may be used to perform the role of volatile memory devices and non-volatile storage media in a computing system.

In one embodiment, the storage device 100 may comprise a block addressable memory device, such as those based on NAND or NOR technologies. The devices $106_1, 106_2 \ldots 106_n$ may be organized as a two-dimensional or three-dimensional NAND array of NAND cells. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

The host interface 104 connects the non-volatile storage device 100 to a host system 108 or storage controller managing a plurality of non-volatile storage devices 100 as an array of storage. The non-volatile storage device 100 may be installed or embedded within the host system 108, such as shown and described with respect to FIG. 6, may be external to the host system, or included in an array of SSD devices managed by a storage server or storage system. The host interface 104 may comprise a bus interface, such as a Peripheral Component Interconnect Express (PCIe) interface, Serial AT Attachment (SATA), Non-Volatile Memory Express (NVMe), etc.

The host interface 104, storage controller 116, CPU 122, transfer buffer 130, and buffer 134 may communicate over one or more bus interfaces 138, such as a PCIe or other type of bus or interface. In alternative embodiments the connection among any of the components 104, 116, 122, 130, 134 may comprise direct lines or paths and not a shared bus. One or more storage controllers 116 may connect to the devices $106_1$, $106_2$ ... $106_n$ and dies 112 over a memory interface 142.

The garbage collection logic 120, in response to commands from the garbage collection manager 128, consolidates valid data written to pages 115 in the device to a new page 115 because flash memory is erased before it can be rewritten. Rewriting data in the flash memory requires pages of data to be read, updated, and written to a new location because data cannot be rewritten in place. The page having the source of the data copied to the new location may then be erased and reused.

Figure 2:
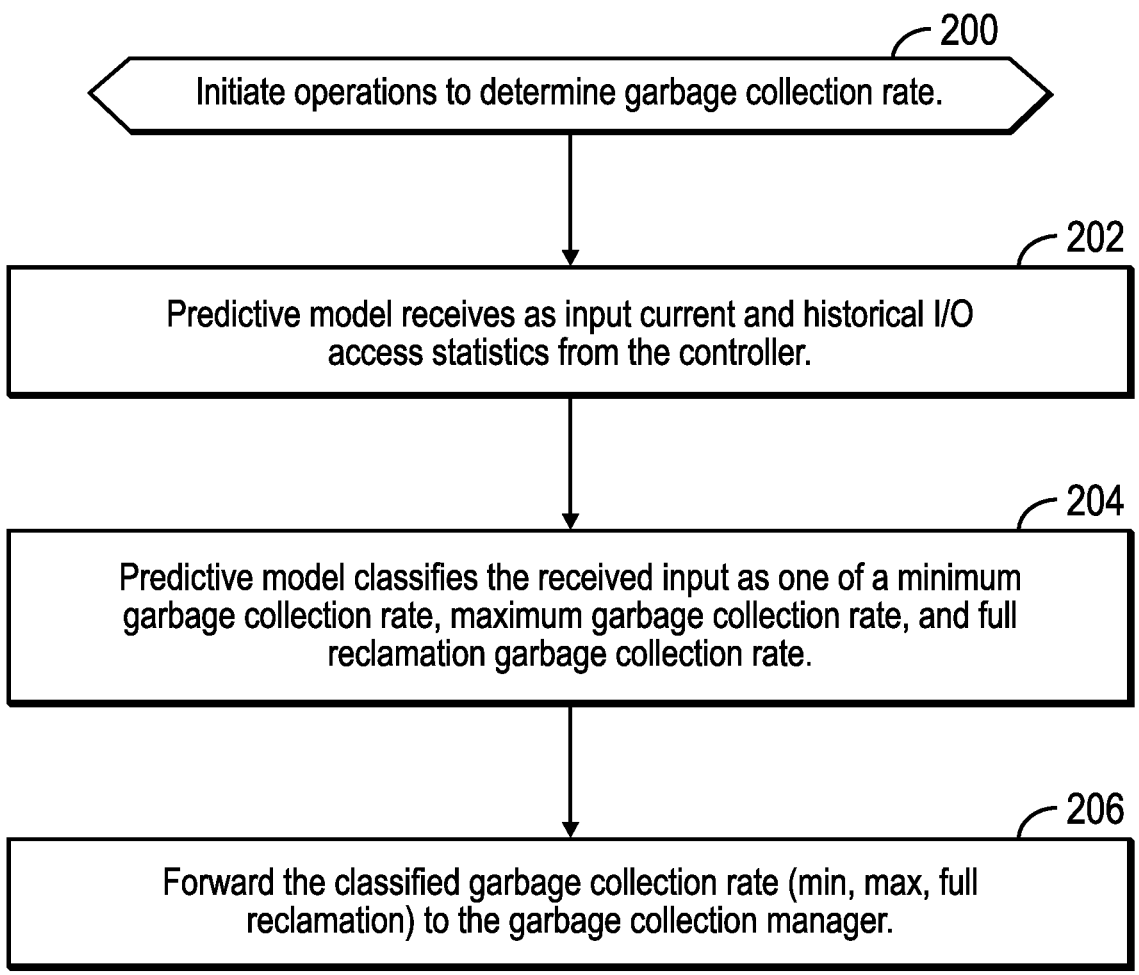
FIG. 2 illustrates an embodiment of operations to determine a garbage collection rate.

FIG. 2 illustrates an embodiment of operations performed by the CPU 122 executing the predictive model 126 to determine the garbage collection rate. In alternative embodiments, the host system 108 or a storage system may implement the predictive model 126 and transmit the garbage collection rate, e.g., minimum, maximum, full reclamation, etc., to the NVS device 100. Upon initiating (at step 200) operations to determine the garbage collection rate, the predictive model 126 receives (at step 202) as input current and historical I/O access, e.g., read and write, statistics from the controller firmware 124, which may be collected by a diagnostic interface or other component. The predictive model 126 classifies (at step 204) the received input as one of a minimum garbage collection rate, maximum garbage collection rate, full reclamation garbage collection rate, or other rate. The determined garbage collection rate is forwarded (at step 206) to the garbage collection manager 128 to use to control garbage collection 120.

With the embodiment of FIG. 2, a garbage collection rate is dynamically determined to continually determine the garbage collection rate based on current I/O access patterns and statistics collected by the NVS device 100. The predictive model 126 may periodically determine the garbage collection rate or in response to an event.

Figure 3A:
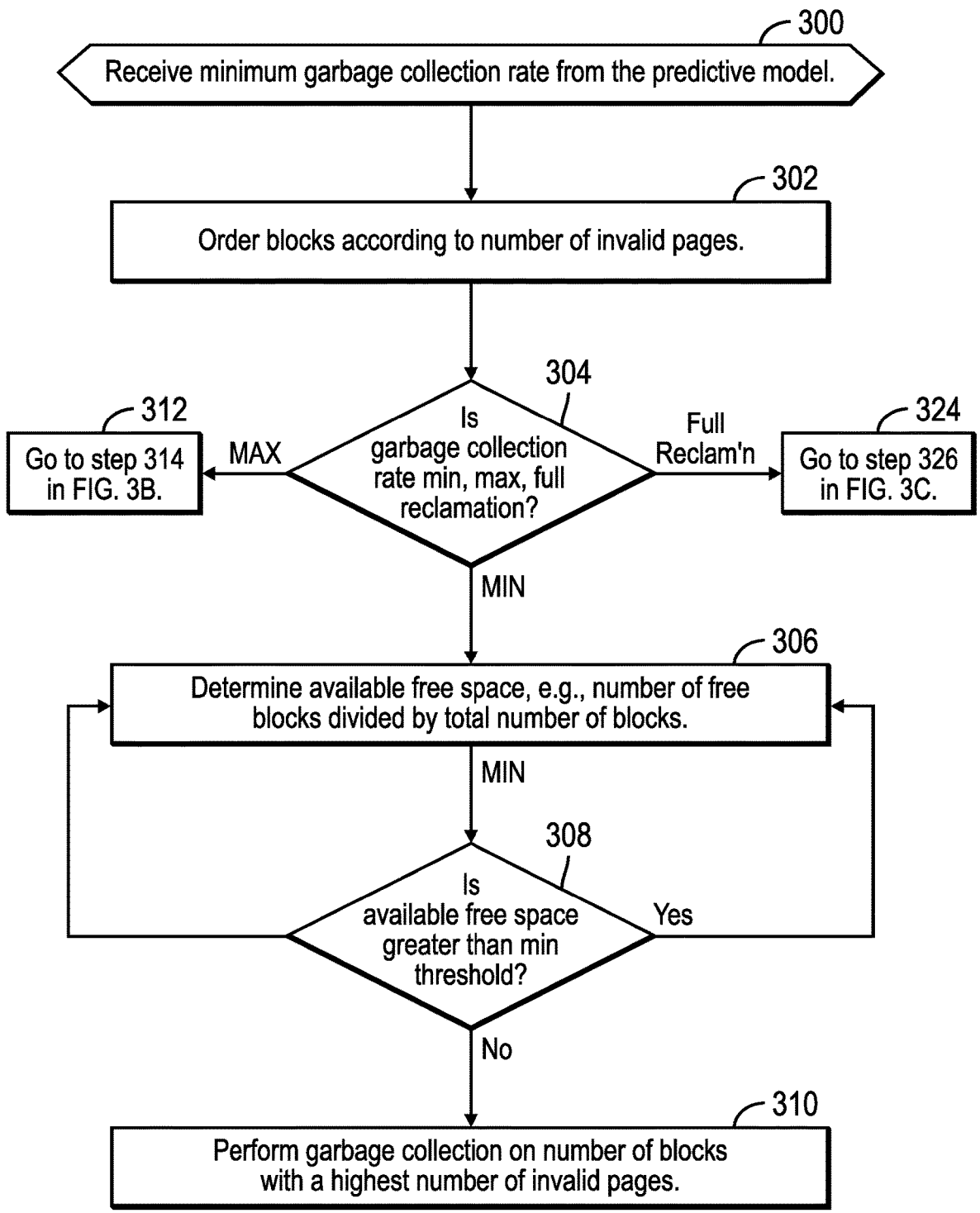
FIGS. 3A, 3B, and 3C illustrate an embodiment of operations to perform garbage collection for different garbage collection rates.
Figure 3B:
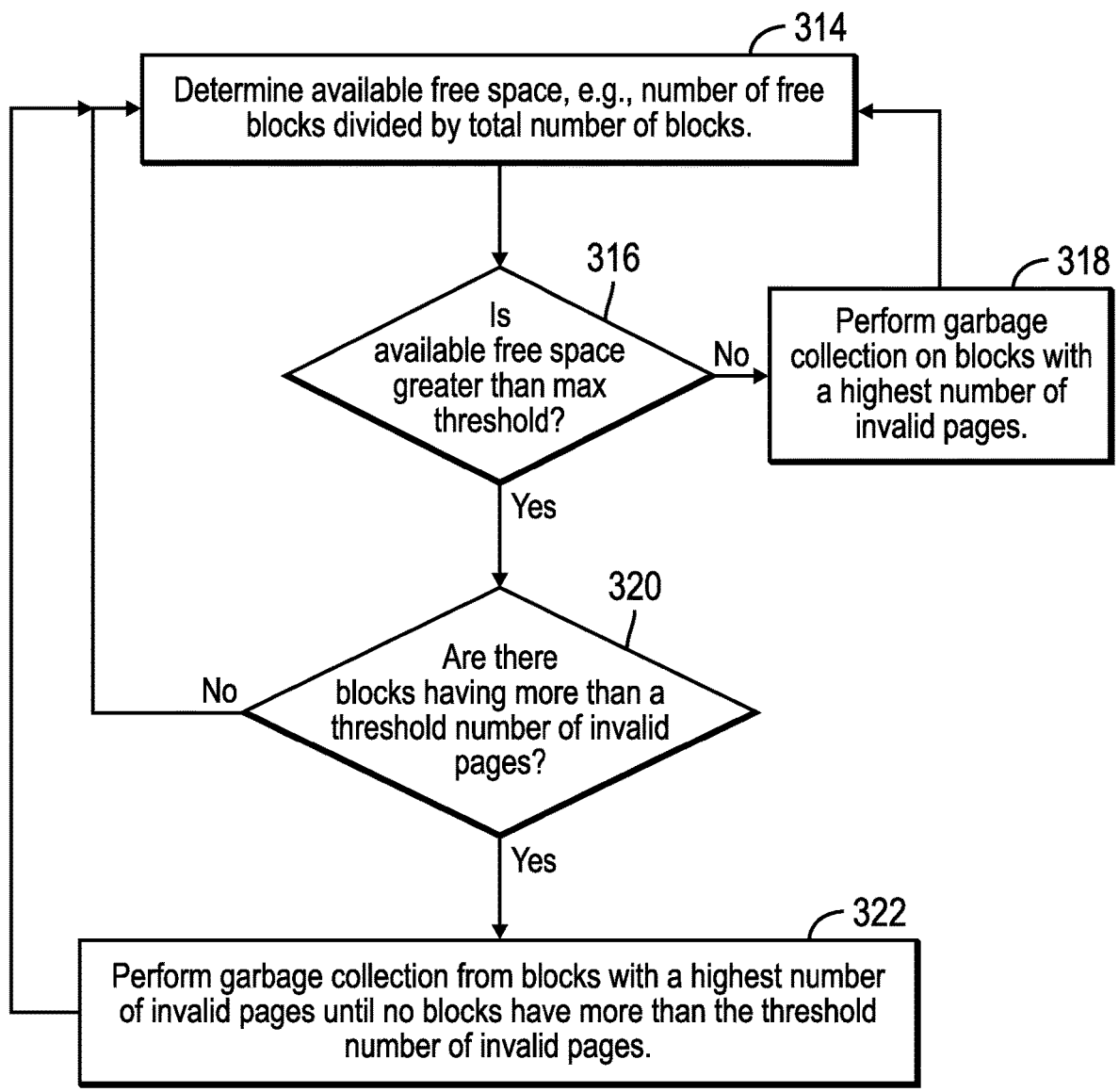
Figure 3C:
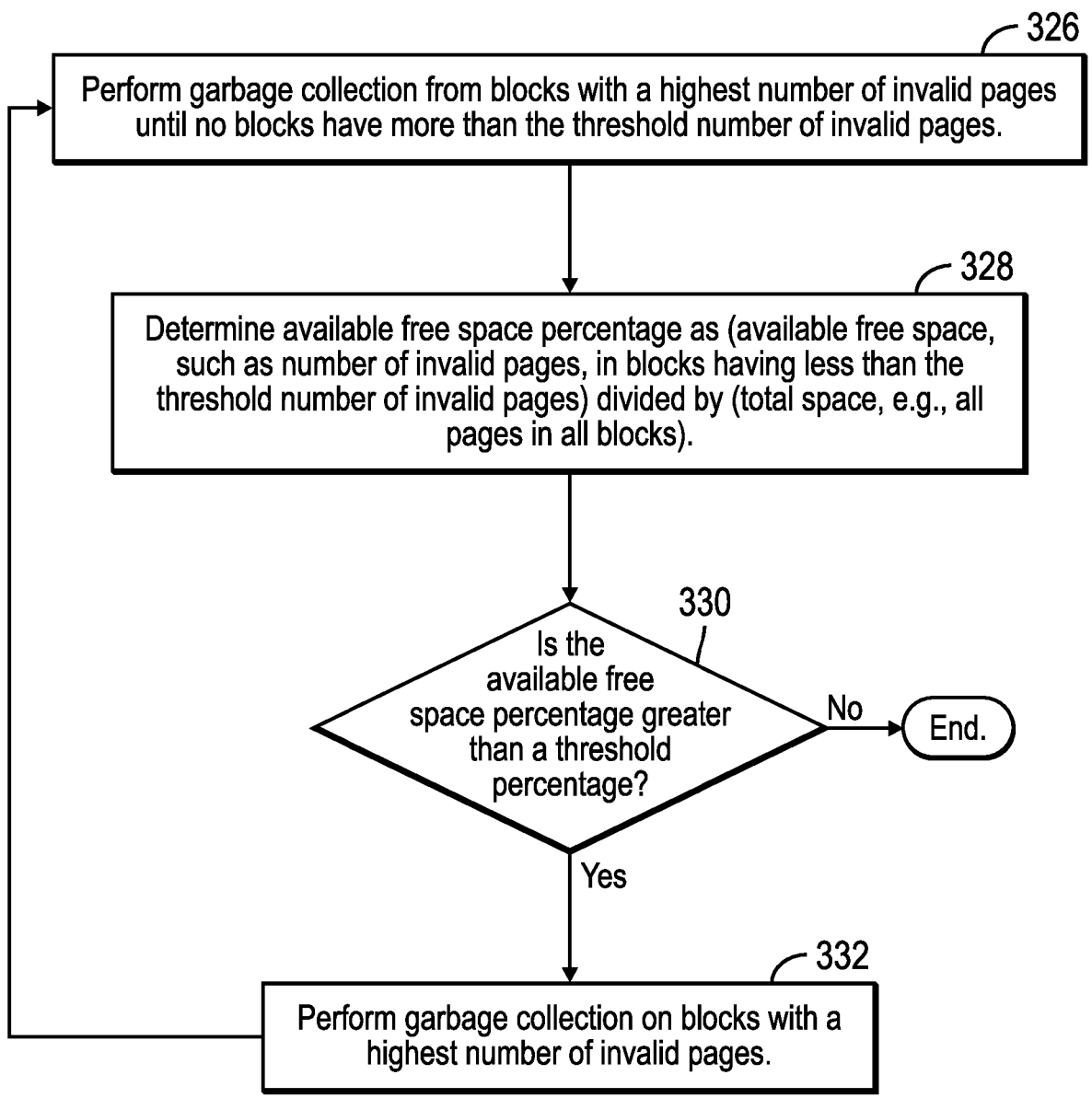

FIGS. 3A, 3B, and 3C illustrate an embodiment of operations performed by the garbage collection manager 128 upon receiving a garbage collection rate from the predictive model 126. Upon receiving (at step 300) the garbage collection rate, the garbage collection manager 128 orders (at step 302) blocks according to a number of valid pages in each of the blocks. If (at step 304) the received garbage collection rate is the minimum garbage collection rate, which is indicated when the I/O access pattern comprises a relatively high access pattern, the garbage collection manager 128 determines (at step 306) available free space, e.g., number of free blocks, divided by total number of blocks in the NVS device 100. If the garbage collection manager 128 determines (at step 308) the available free space is not greater than a minimum threshold, i.e., there is not a sufficient amount of free blocks, the garbage collection manager 128 causes (at step 310) garbage collection 120 until available free space is greater than the minimum threshold. After performing garbage collection 120 for a predetermined number of blocks or a predetermined time, control proceeds back to step 306 to continue to determine if available free space is greater than the minimum threshold until the garbage collection rate changes.

If (at step 304) the garbage collection rate is the maximum garbage collection rate, then control proceeds (at step 312) to step 314 in FIG. 3B to determine available free space. If (at step 316) available free space is not greater than a maximum threshold, which may be the same or different than the minimum threshold, the garbage collection manager 128 causes (at step 318) garbage collection 120 on blocks having a highest number of invalid pages. If (at step 316) available free space is less than the maximum threshold and if (at step 320) there are blocks having more than a threshold number of invalid pages, garbage collection 120 is performed (at step 322) from blocks with a highest number of invalid pages until no blocks have more than the threshold number of invalid pages. After garbage collecting blocks at steps 318, 322 or if (at step 320) there no blocks having more than a threshold number of invalid pages, control proceeds back to step 314 to continue garbage collection at the maximum garbage collection rate.

If (at step 304) the received garbage collection rate indicates full reclamation, such as when the I/O access pattern is at a lowest access rate level, control proceeds (at step 324) to step 326 in FIG. 3C to perform garbage collection from blocks with a highest number of invalid pages until no blocks have more than the threshold number of invalid pages. Available free space percentage is determined (at step 328) as (available free space, such as number of invalid pages, in blocks having less than the threshold number of invalid pages) divided by (total space, e.g., all pages in all blocks). If (at step 330) the available free space percentage is greater than a threshold percentage, garbage collection 120 is performed (at step 332) on blocks with a highest number of invalid pages. After performing garbage collection for a predetermined time or number of blocks, control proceeds to step 328 to determine the available free space percentage. If (at step 330) available free space is less than the threshold percentage, control ends as full reclamation has completed. In an alternative embodiment of full reclamation, blocks with a very low number of invalid pages, e.g., one or two invalid pages, may not be garbage collected.

With the operations of FIG. 3A, 3B, 3C, if while garbage collection is performed according to the operations in FIGS. 3A, 3B, and 3C, a new garbage collection rate is received at step 300 in FIG. 3A, then current garbage collection operations are interrupted to perform garbage collection at the new garbage collection rate according to FIG. 3A, 3B, 3C. With described embodiments, the amount of garbage collection is adjusted based on current I/O access patterns, so that more garbage collection is performed for relatively lower I/O access rates in the NVS storage 100 because more resources are available during low I/O access rates. If I/O access rates increase, than garbage collection is reduced to free resources for I/O access to minimize latency in processing I/O requests.

Figure 4:
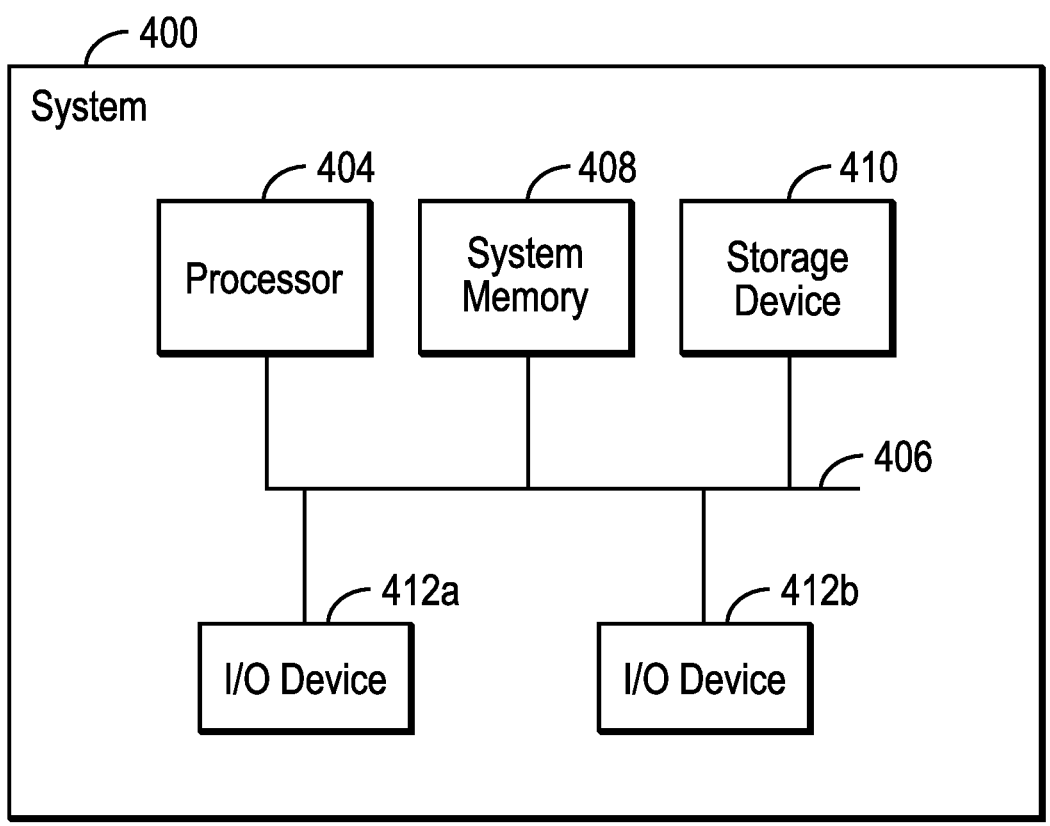
FIG. 4 depicts a computing environment in which the components of FIG. 1 may be implemented.

FIG. 4 illustrates an embodiment of a system 400 in which the non-volatile storage device 100 of FIG. 1 may be deployed as the system memory device 408 and/or a storage device 410. The system 400 includes a processor 404 that communicates over a bus 406 with a system memory device 408, which may comprise a volatile memory, e.g., Dynamic Random Access Memory (DRAM), in which programs, operands and parameters being executed are cached, and a storage device 410, which may comprise a solid-state drive (SSD) that stores programs and user data that may be loaded into the system memory 408 for execution. The processor 404 may also communicate with Input/Output (I/O) devices 412a, 412b, which may comprise input devices (e.g., keyboard, touchscreen, mouse, etc.), display devices, graphics cards, ports, network interfaces, etc. The memory 408 and storage device 410 may be coupled to an interface on the system 400 motherboard, mounted on the system 400 motherboard, or deployed in an external memory device or accessible over a network.

Figure 5:
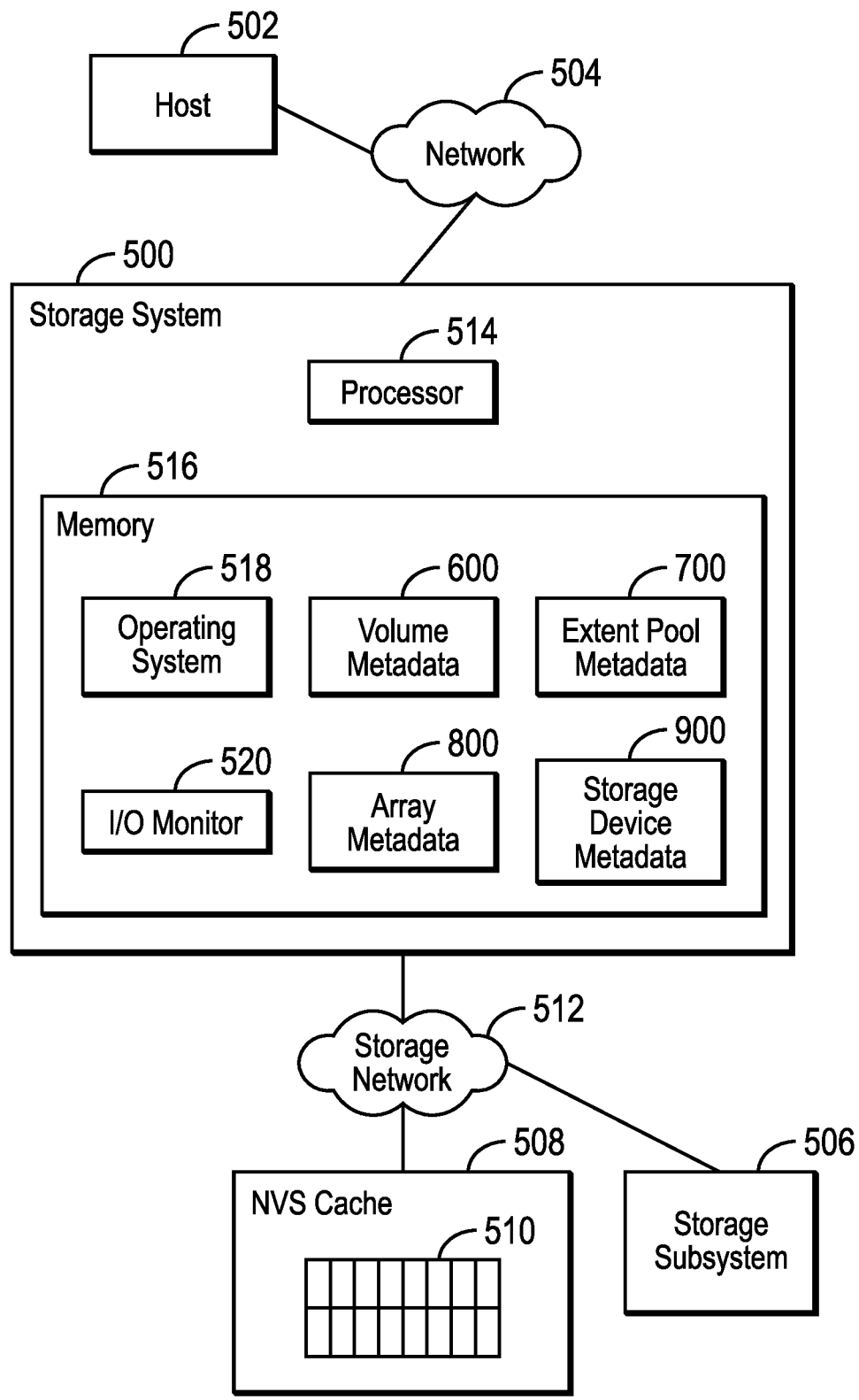
FIG. 5 illustrates an embodiment of a storage environment.

FIG. 5 illustrates an embodiment of a storage environment having a storage system 500, such as a storage server, storage controller, etc., that stores data from host systems 502 over a network 504 in a storage subsystem 506. The storage system 500 may further maintain a non-volatile storage (NVS) cache 508 having arrays 510 of storage devices, such as flash drives or Solid-State Drives (SSDs), forming a flash data storage. The NVS cache 508 comprises a high-speed cache to cache data from the storage subsystem 506, which may comprise magnetic hard disk drives. The storage system 500 may connect to the NVS cache 508 and storage subsystem 506 via a storage network 512.

The storage system 500 includes a processor complex 514 and a memory 516 including an operating system 518 to manage volumes configured in the storage subsystem 506 and cached in the NVS cache 508, and an Input/Output monitor 520 to gather I/O access statistics for arrays and extents configured in the storage devices 510. The operating system 518 maintains information on volumes configured in storage arrays, such as Redundant Array of Independent Disks (RAID) arrays, implemented in the NVS cache 508, including volume metadata 600 having information on configured volumes, extent pool metadata 700 on pools of extents; array metadata 800 having information on storage arrays, e.g., RAID arrays, configured in the NVS cache 508, and storage device metadata 900 having information on the storage devices 510 comprising the NVS cache 508. The arrays may be striped across the storage devices 510 in the NVS cache 508.

The array of storage devices 510 in the NVS cache 508 may comprise instances of the storage device described with respect to FIGS. 1-4 above.

In certain embodiments, the storage system 500 may comprise an enterprise storage controller, such as the International Business Machines Corporation (IBM®) DS8000™ storage controller or storage controllers from other vendors. The host 502 may comprise an enterprise host system that includes an operating system such as, but not limited to, the IBM® Z/OS® operating system. The NVS cache 508 may comprise a Flash data storage, such as, but not limited to, the IBM FlashSystem®. (IBM, Z/OS, IBM FlashSystem, and DS8000 are registered trademarks of IBM throughout the world).

The operating system 518 and I/O monitor 520 may comprise program code loaded into the memory 114 and executed by one or more of the processors 514. Alternatively, some or all of the functions may be implemented as microcode or firmware in hardware devices in the storage controller 500, such as in Application Specific Integrated Circuits (ASICs) and Field Programmable Gate Array (FPGA).

The storage devices 510 in the NVS cache 508 and storage subsystem 506 may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The networks 504, 512 may comprise a Storage Area Network (SAN), a Local Area Network (LAN), a Wide Area Network (WAN), the Internet, and Intranet, etc.

Figure 6:
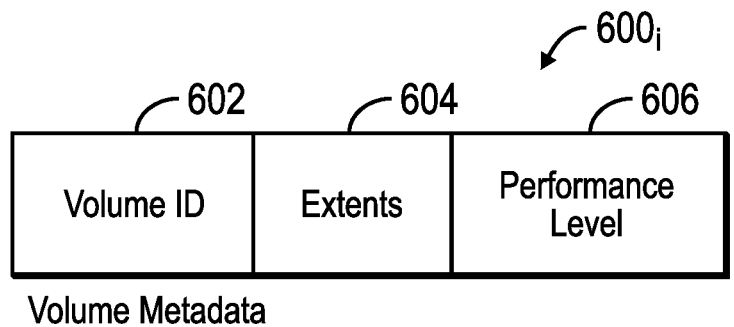
FIG. 6 illustrates an embodiment of volume metadata.

FIG. 6 illustrates an embodiment of an instance 6001 of volume metadata 600 including a volume identifier (ID) 602; extents 604 configured in storage arrays assigned to the volume 602; and a performance level 606 assigned to the volume 602, which may be assigned by a host system 502 or set by the I/O monitor based on I/O access patterns to the volume 602. An extent identifies a range of tracks to assign to volumes, A track comprises any addressable storage unit representing data in storage and memory, also referred to as a block, logical address, logical block address (LBA), physical block address, etc.

Figure 7:
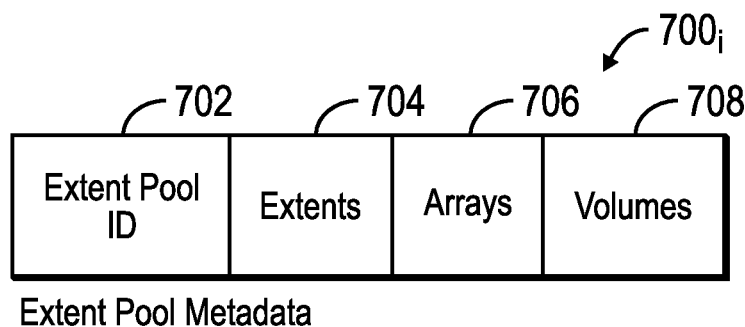
FIG. 7 illustrates an embodiment of extent pool metadata.

FIG. 7 illustrates an embodiment of an instance $700_i$ of extent pool metadata 700 including an extent pool ID 702; extents 704 assigned to the pool 702; arrays 706, such as RAID arrays, assigned to the extent pool 702 in which extents in the pool 702 are configured; and volumes 708 created from extents in the extent pool 702.

Figure 8:
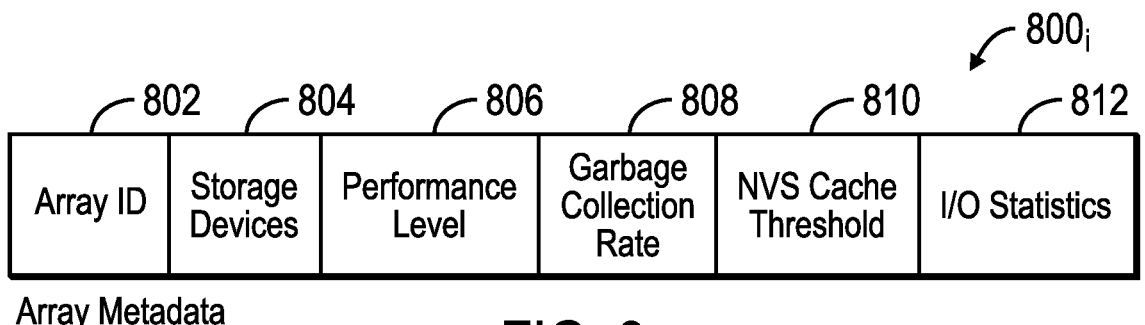
FIG. 8 illustrates an embodiment of array metadata.

FIG. 8 illustrates an embodiment of an instance $800_i$ of array metadata 800, including: an array ID 802 of an array, such as a RAID array, JBOD, DASD, etc.; storage devices 804 in which the array 802 is configured; a performance level 806 assigned to the array 802; a garbage collection rate 808 assigned to the array 802 to apply to storage devices 804 in which the array 802 resides; an NVS cache threshold 810 indicating a percentage, such that when the data stored in the array 802 is the threshold 810 percentage of the NVS cache 508, data must be destaged from the array 802 before new writes can be written, otherwise known as coerced cache eviction; and I/O statistics 812, such as read and write statistics for the array 802.

Figure 9:
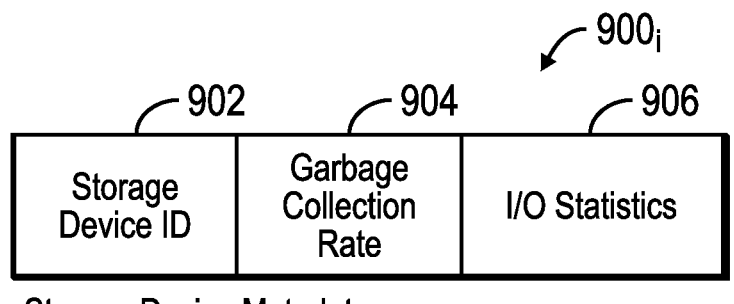
FIG. 9 illustrates an embodiment of storage device metadata.

FIG. 9 illustrates an embodiments of an instance $900_i$ of storage device metadata 900, including a storage device ID 902 in the array 510 for which the metadata is maintained; a garbage collection rate 904 assigned to the storage device 902 indicating a garbage collection algorithm for the storage device 902 to apply, such as high, low, full reclamation; and I/O statistics 906, such as read and write statistics gathered for the storage device 902.

The relationship of information described with respect to FIGS. 6-9 may be stored in different arrangements and associations than described with respect to FIGS. 6-9.

Figure 10:
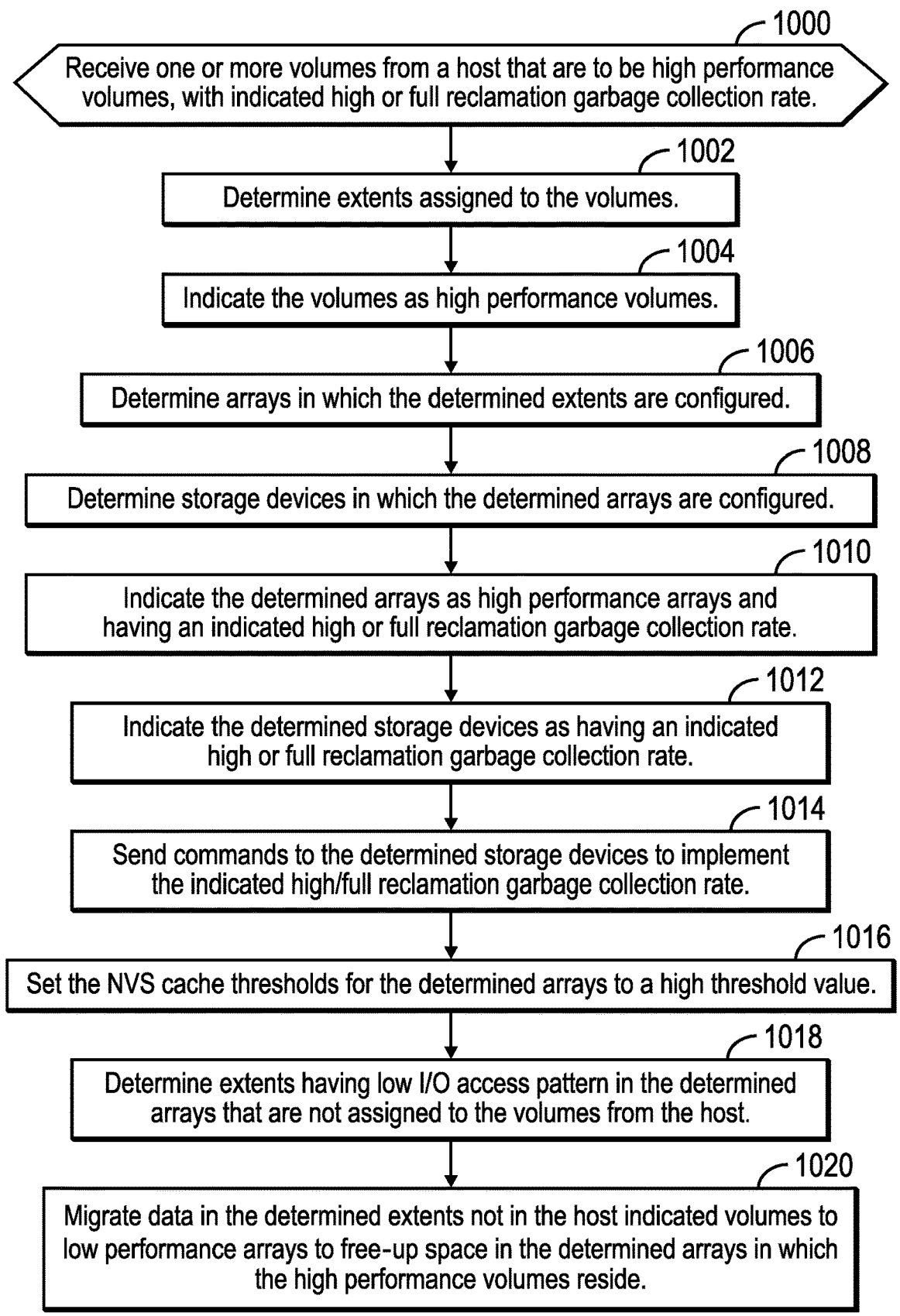
FIG. 10 illustrates an embodiment of operations to improve the performance of storage devices in which indicated high-performance volumes reside.

FIG. 10 illustrates an embodiment of operations performed by the operating system 518 and I/O monitor 520 to update settings for arrays and storage devices to operate at a higher performance level for volumes the host system 502 identifies as high-performance volumes. Upon receiving (at block 1000) indication of one or more volumes $600_i$ that are to be high-performance volumes and a garbage collection rate for the volumes, from the host 502 or the I/O monitor 520, the operating system 518 determines (at block 1002) extents assigned to or available for the indicated volumes $600_i$. To make this determination of extents assigned/available to the indicated volumes $600_i$, the operating system 518 may determine extent pools $700_i$ to which the indicted volumes $600_i$ are assigned, in field 708, and then determine the extents 704 assigned to the extent pools 702 to which the volumes are assigned. The performance level 606 of volumes $600_i$ identified by the host 502 are indicated (at block 1004) as high-performance volumes.

The operating system 518 determines (at block 1006) arrays $800_i$ in which the determined extents reside. This may be determined from the arrays 706 indicted in the extent pools $700_i$ to which the indicated volumes $600_i$ are assigned. A determination is made (at block 1008) of the storage devices 510 in which the determined arrays $800_i$ reside, which may be determined from the indicated storage devices 804 for the determined arrays $800_i$. The determined arrays $800_i$ are indicated (at block 1010), in performance level 806, as high-performance arrays, and having a garbage collection rate 808 comprising an indicated a high or full reclamation garbage collection rate. The determined storage devices $900_i$ are indicated (at block 1012) as having the indicated high or full reclamation garbage collection rate 904. For instance, the high garbage collection rate may be indicated a first level of high-performance and the full reclamation garbage collection rate may be indicated for a second level of high-performance greater than the first level. The volumes may also be indicated to set at a low garbage collection rate, such as described above with respect to FIG. 3C.

The operating system 518 may send (at block 1014) commands to the determined storage devices to implement the high/full reclamation garbage collection rate as described above with respect to FIGS. 3A, 3B, and 3C. The operating system 518 sets (at block 1016) the NVS cache thresholds 810 for the determined arrays $800_i$ to a high threshold value. This causes the operating system 518 to require that data be destaged from an array $800_i$ before new writes are written when the array $800_i$ comprises a percentage of the NVS cache 508 that is greater than the indicated NVS cache threshold 810 for the array $800_i$. Setting the NVS cache threshold 810 to a higher percentage improves the performance by requiring destaging at a higher level.

The operating system 518 determines (at block 1018) extents, having a low I/O access rate, in the determined arrays $800_i$ from which the high-performance volumes are assigned extents. Extents having a low I/O access rate may be determined from the I/O statistics 812. For instance, for arrays 706 assigned to extent pools $700_i$ to which the indicated volumes $600_i$ are assigned, a determination may be made of extents in those arrays with a low I/O access rate that are not assigned to the indicated volumes 6001, but other volumes. The operating system 518 may then migrate (at block 1020) data in the determined extents not in the host indicated volumes to low performance arrays to free-up space in the determined arrays in which the high-performance volumes reside. Alternatively, the determined extents may be migrated to other storage, such as cloud or tape.

With the embodiment of FIG. 10, the storage system 500 manages the storage used by the high-performance volumes using different performance enhancement techniques. These storage performance enhancement techniques include increasing the garbage collection rate in the storage devices in which the high-performance volumes reside, increasing the NVS cache threshold for arrays in which the high-performance volumes reside, and migrating extents having low access rates that are not used by the high-performance volumes to arrays not used by the volumes. All these operations boost the performance of the storage in which the high-performance volumes reside.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
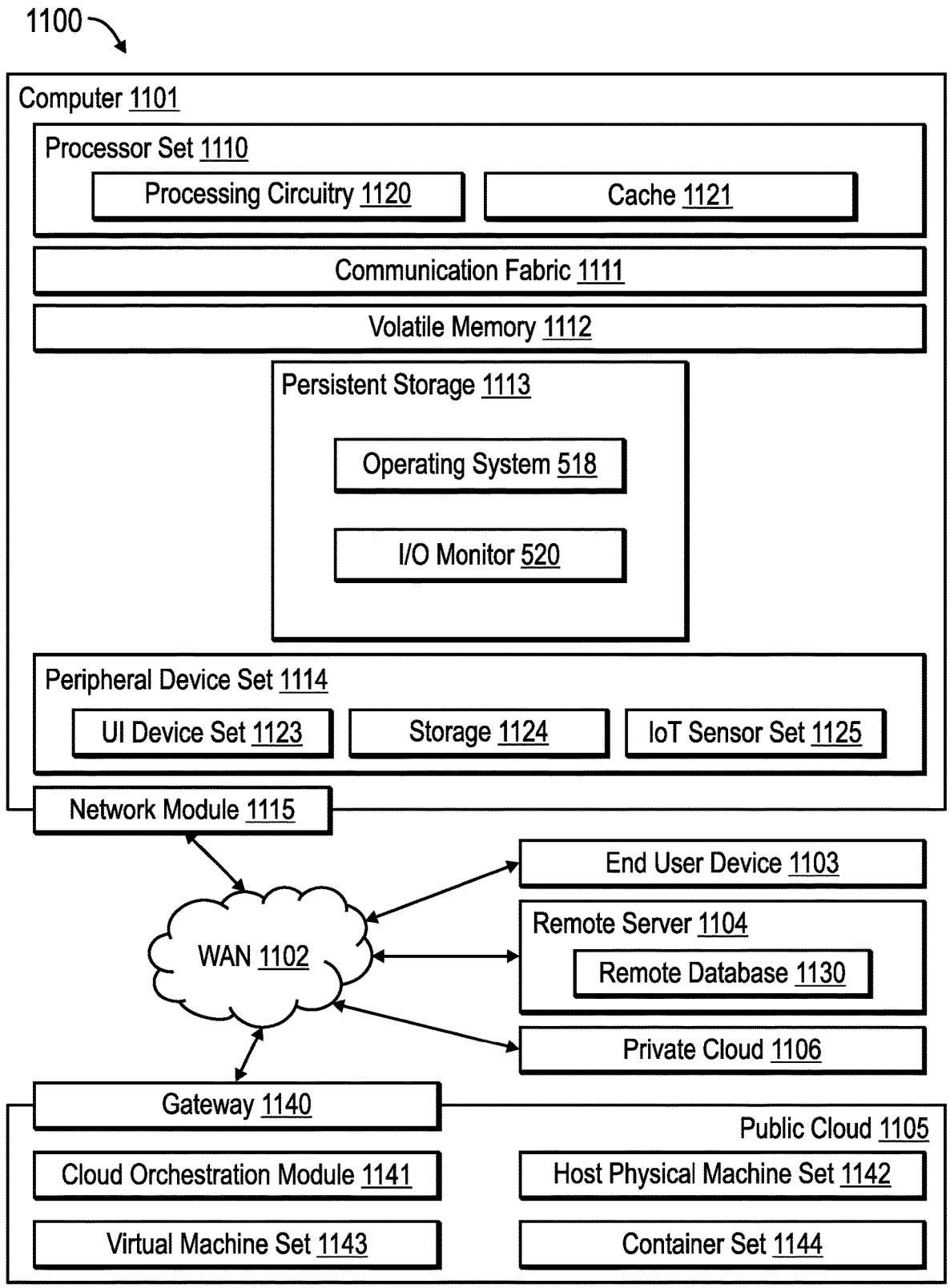
FIG. 11 illustrates a computing environment in which the components of FIG. 5 may be implemented.

With respect to FIG. 11, computing environment 1100 contains an example of an environment for the execution of at least some of the computer code involved in performing the inventive methods, such as enhancing the performance of storage in which high-performance volumes reside. Computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 518 and I/O monitor 520, as described above with respect to FIG. 5), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer-readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in persistent storage 113, including in the operating system 518 and I/O monitor 520, typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. For instance, the storage 1124 may comprise the NVS cache 508 and storage subsystem 506 described above with respect to FIG. 5. In certain embodiments, storage 1124 may comprise IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer-readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

CLOUD COMPUTING SERVICES AND/OR MICROSERVICES (not separately shown in FIG. 11): private and public clouds 1106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing arrays of storage devices in which volumes are configured, wherein the computer program product comprises a computer readable storage medium having program instructions executable by a processor to cause operations, the operations comprising:
   indicating a volume configured in the arrays to have high-performance;
   determining an array storing the indicated volume;
   determining storage devices in which the determined array resides, wherein the determined storage devices are enabled to perform garbage collection on blocks of data having valid and invalid pages in the determined storage devices at a first garbage collection rate and a second garbage collection rate, wherein the second garbage collection rate causes a storage device to perform garbage collection with respect to a greater number of blocks than the first garbage collection rate; and
   sending a command to the determined storage devices to garbage collect at the second garbage collection rate.

2. The computer program product of claim 1, wherein the determined array comprises a Redundant Array of Independent Disk (RAID) array, wherein the operations further comprise:
   determining extents configured in the RAID array on which the indicated volume resides, wherein the determining the RAID array comprises determining the RAID array of a plurality of RAID arrays storing the indicated volume.

3. The computer program product of claim 1, wherein the determined storage devices comprise a cache for a server, wherein the determined array is associated with one of a first threshold and a second threshold, wherein the second threshold comprises a higher percentage than the first threshold, wherein the operations further comprise:
   assigning the second threshold to the determined array; and
   destaging data from the determined array before writing new data to the determined array in response to determining the determined array comprises a percentage of the cache exceeding the second threshold.

4. The computer program product of claim 1, wherein arrays are comprised of extents of data, wherein the operations further comprise:
   determining extents, accessed at a relatively low I/O rate, in the determined array not storing data for the indicated volume; and
   moving data for the determined extents to an array not storing data for the indicated volume.

5. The computer program product of claim 4, wherein the moving the data to the array not storing data for the indicated volume comprises moving the data for the indicated volume to a low performance array.

6. The computer program product of claim 1, wherein the volume is indicated in a message from a host system indicating the volume as a high-performance volume.

7. The computer program product of claim 1, wherein the command to the determined storage devices to garbage collect at the second garbage collection rate causes the determined storage devices each to initiate garbage collection on blocks in response to: (1) available free space in a determined storage device is below a threshold and (2) blocks in the determined storage device have more than a threshold number of invalid pages in response to the available free space being below the threshold.

8. The computer program product of claim 1, wherein the command to the determined storage devices to garbage collect at the second garbage collection rate causes the determined storage devices each to perform garbage collection on: (1) blocks having a number of invalid pages greater than a threshold number of invalid pages and (2) on blocks having a number of invalid pages less than the threshold number in response to an available free space percentage of blocks having invalid pages less than the threshold number exceeding a threshold percentage.

9. A system for managing arrays of storage devices in which volumes are configured, comprising:

a processor; and a computer readable storage medium having program instructions executable by the processor to cause operations, the operations comprising:

indicating a volume configured in the arrays to have high-performance;

determining an array storing the indicated volume;

determining storage devices in which the determined array resides, wherein the determined storage devices are enabled to perform garbage collection on blocks of data having valid and invalid pages in the determined storage devices at a first garbage collection rate and a second garbage collection rate, wherein the second garbage collection rate causes a storage device to perform garbage collection with respect to a greater number of blocks than the first garbage collection rate; and sending a command to the determined storage devices to garbage collect at the second garbage collection rate.

10. The system of claim 9, wherein the determined storage devices comprise a cache for a server, wherein the determined array is associated with one of a first threshold and a second threshold, wherein the second threshold comprises a higher percentage than the first threshold, wherein the operations further comprise:

assigning the second threshold to the determined array; and destaging data from the determined array before writing new data to the determined array in response to determining the determined array comprises a percentage of the cache exceeding the second threshold.

11. The system of claim 9, wherein arrays are comprised of extents of data, wherein the operations further comprise:

determining extents, accessed at a relatively low I/O rate, in the determined array not storing data for the indicated volume; and moving data for the determined extents to an array not storing data for the indicated volume.

12. The system of claim 11, wherein the moving the data to the array not storing data for the indicated volume comprises moving the data for the indicated volume to a low performance array.

13. The system of claim 9, wherein the command to the determined storage devices to garbage collect at the second garbage collection rate causes the determined storage devices each to initiate garbage collection on blocks in response to: (1) available free space in a determined storage device is below a threshold and (2) blocks in the determined storage device have more than a threshold number of invalid pages in response to the available free space being below the threshold.

14. The system of claim 9, wherein the command to the determined storage devices to garbage collect at the second garbage collection rate causes the determined storage devices each to perform garbage collection on: (1) blocks having a number of invalid pages greater than a threshold number of invalid pages and (2) on blocks having a number of invalid pages less than the threshold number in response to an available free space percentage of blocks having invalid pages less than the threshold number exceeding a threshold percentage.

15. A method for managing arrays of storage devices in which volumes are configured, comprising:

indicating a volume configured in the arrays to have high-performance;

determining an array storing the indicated volume;

determining storage devices in which the determined array resides, wherein the determined storage devices are enabled to perform garbage collection on blocks of data having valid and invalid pages in the determined storage devices at a first garbage collection rate and a second garbage collection rate, wherein the second garbage collection rate causes a storage device to perform garbage collection with respect to a greater number of blocks than the first garbage collection rate; and sending a command to the determined storage devices to garbage collect at the second garbage collection rate.

16. The method of claim 15, wherein the determined storage devices comprise a cache for a server, wherein the determined array is associated with one of a first threshold and a second threshold, wherein the second threshold comprises a higher percentage than the first threshold, further comprising:

assigning the second threshold to the determined array; and destaging data from the determined array before writing new data to the determined array in response to determining the determined array comprises a percentage of the cache exceeding the second threshold.

17. The method of claim 15, wherein arrays are comprised of extents of data, further comprising:

determining extents, accessed at a relatively low I/O rate, in the determined array not storing data for the indicated volume; and moving data for the determined extents to an array not storing data for the indicated volume.

18. The method of claim 17, wherein the moving the data to the array not storing data for the indicated volume comprises moving the data for the indicated volume to a low performance array.

19. The method of claim 15, wherein the command to the determined storage devices to garbage collect at the second garbage collection rate causes the determined storage devices each to initiate garbage collection on blocks in response to: (1) available free space in a determined storage device is below a threshold and (2) blocks in the determined storage device have more than a threshold number of invalid pages in response to the available free space being below the threshold.

20. The method of claim 15, wherein the command to the determined storage devices to garbage collect at the second garbage collection rate causes the determined storage devices each to perform garbage collection on: (1) blocks having a number of invalid pages greater than a threshold number of invalid pages and (2) on blocks having a number of invalid pages less than the threshold number in response to an available free space percentage of blocks having invalid pages less than the threshold number exceeding a threshold percentage.

\* \* \* \* \*